July 16, 1968  L. B. ROOF  3,392,571
DUAL CHAMBER WHISTLE TYPE ACOUSTIC FREQUENCY DETECTOR FOR GAS
Filed Nov. 12, 1964
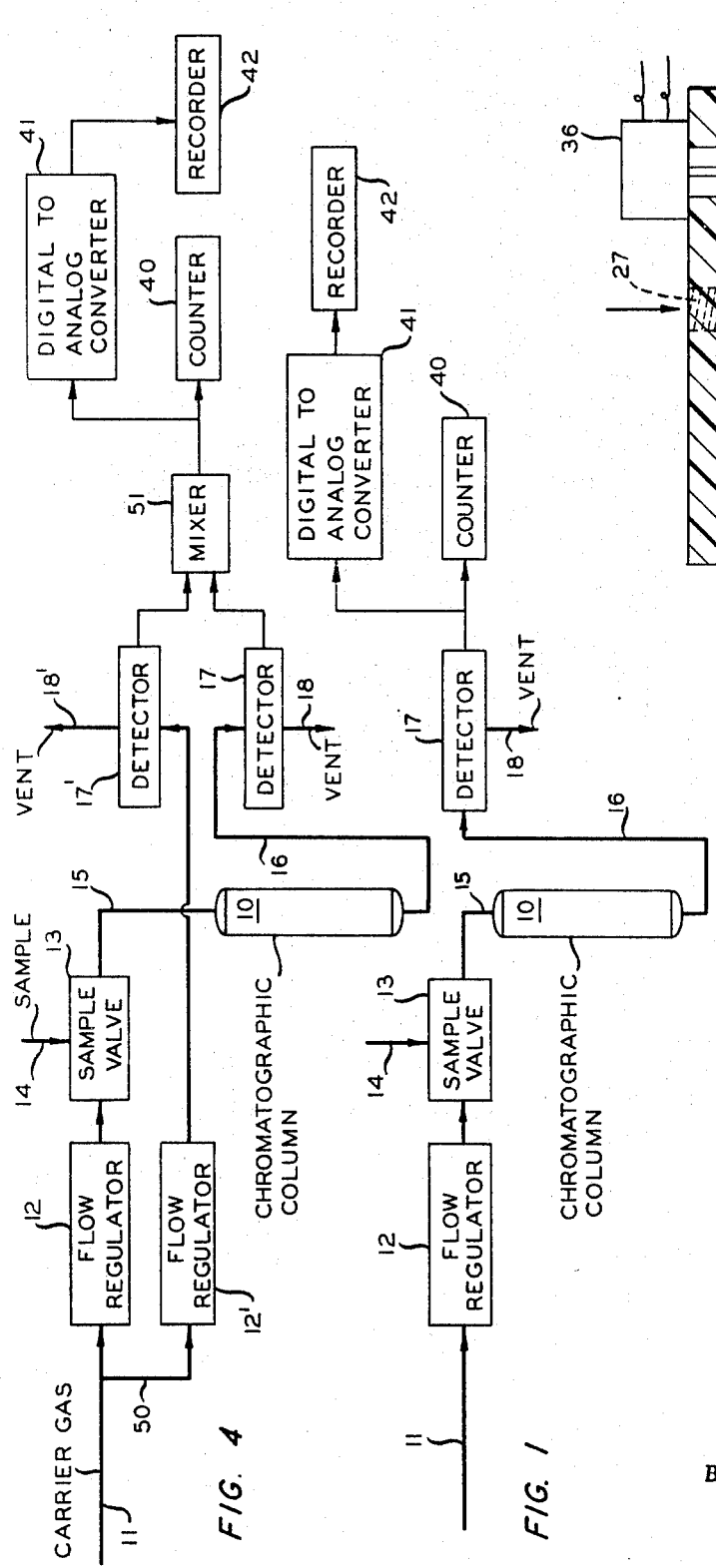
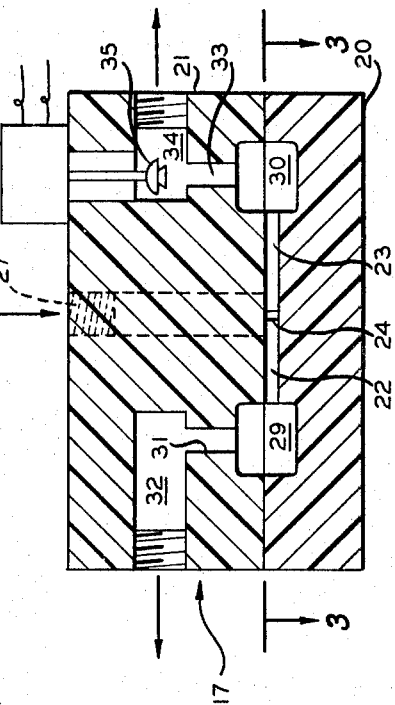
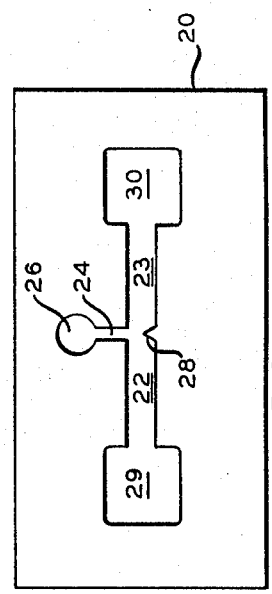
INVENTOR.
L. B. ROOF
BY *Young & Quigg*
ATTORNEYS

United States Patent Office 3,392,571
Patented July 16, 1968

3,392,571
DUAL CHAMBER WHISTLE TYPE ACOUSTIC FREQUENCY DETECTOR FOR GAS
Lewis B. Roof, Bartlesville, Okla., assignor to Phillips Petroleum Company, a corporation of Delaware
Filed Nov. 12, 1964, Ser. No. 410,427
3 Claims. (Cl. 73—24)

ABSTRACT OF THE DISCLOSURE

In the analysis of a gas by measuring the frequency of the sound it makes as it is forced through a whistle, the frequency is doubled by employing open end type resonating cavities, and the amplitude is doubled by employing two such cavities separated by a wedge disposed to split the gas forced into the whistle between the two cavities, over the prior art use of a single closed end cavity whistle.

---

This invention relates to improved acoustic frequency detectors for gas having a whistle with dual open end type resonating cavities.

In many industrial and laboratory operations there is a need to measure the composition of gaseous streams. One analysis procedure that has been widely used in recent years is that of chromatography. A fluid mixture to be analyzed is separated into individual constituents or groups of constituents by passing the mixture through a chromatographic column. The constituents of the mixture thus appear in the column effluent in sequence and are detected by measuring some change in property of the effluent stream which is representative of composition.

In one of its aspects, this invention is directed toward providing an improved detector for use with a chromatographic analyzer. The detector comprises a housing which has a first passage therein. The gaseous mixture to be analyzed is introduced into the housing through a second passage which communicates with the mid-point of the first passage and at right angles thereto. A wedge is disposed in the first passage opposite the second passage so that the inlet gaseous stream is split to flow into the two leg of the first passage. The two streams are removed from the housing after flowing through the two legs of the first passage. High frequency vibrations are set up within the housing by the wedge and the adjoining resonant chambers. These vibrations can be measured by a conventional detector, whereby changes in frequency are indicative of changes in composition of the gaseous stream being measured.

Accordingly, it is an object of this invention to provide an improved detector for use with chromatographic analyzers.

Another object is to provide apparatus for use in measuring changes in composition or other properties of gaseous mixtures.

A further object is to provide a novel fluid oscillator.

Other objects, advantages and features of the invention should become apparent from the following detailed description, taken in conjunction with the accompanying drawing in which:

FIGURE 1 is a schematic representation of a chromatographic analyzer having the detector of this invention incorporated therein.

FIGURE 2 is a view, shown partially in section, of the detector of this invention.

FIGURE 3 is a view taken along line 3—3 of FIGURE 2.

FIGURE 4 is a schematic representation of a second embodiment of the detector system of this invention employed in a chromatographic analyzer.

Referring now to the drawing in detail and to FIGURE 1 in particular, there is shown a chromatographic column 10 which is filled with a suitable packing material. A carrier gas stream is introduced into the system through a conduit 11, which has a flow regulator 12 therein to insure a constant rate of flow of carrier gas. Conduit 11 communicates with the inlet of a sample valve 13. A fluid sample to be analyzed is introduced into valve 13 through a conduit 14. Sample valve 13 can be any device known in the art which is capable of introducing preselected amounts of sample periodically into the inlet of column 10. The outlet of sample valve 13 is connected to the inlet of column 10 by a conduit 15. The effluent from column 10 is directed through a conduit 16 to the inlet of a detector 17. This column effluent is vented from detector 17 by means of a conduit 18.

Detector 17 is illustrated in FIGURES 2 and 3. The detector comprises a housing which is formed of a base member 20 and a top member 21 that are secured together in any suitable fashion. These members can be formed of any convenient materials of construction. Synthetic resins are particularly useful because they can readily be shaped to the desired configuration. Base member 20 is provided with a central straight passage formed of two legs 22 and 23. A passage 24 communicates with the junction between legs 22 and 23 and is at right angles to the straight passage. Conduit 16 of FIGURE 1 supplies the column effluent to an inlet port 27 which is in communication with a chamber 26. The gas flows from chamebr 26 through passage 24. A wedged shape projection 28 is positioned across from the exit of passage 24 so as to assist in dividing the stream into passages 22 and 23. Enlarged chambers 29 and 30 communicate with the respective ends of passages 22 and 23. The structure thus provides two resonant cavities on opposite sides of inlet passage 24.

Passages 31 and 32 are formed in member 21 so that the gas in chamber 29 is provided with an outlet to the exterior of the housing. Similar passages 33 and 34 communicate with chamber 30. A vibration detector 35 is secured to a mounting plug 36 so as to be positioned in passage 34 adjacent passage 33. The flow of gas from chamber 30 through passage 33 thus impinges on detector 35. The division of inlet gas into passages 22 and 23 establishes vibrations which are detected by element 35. This structure comprising passages 22, 23 and 24, and projection 28, comprises an acoustic whistle for a whistle-type acoustic frequency detector for gas. The frequency of these vibrations which are set up in this acoustical whistle depends on the composition of gas flowing through the housing. Thus, changes in measured frequency are indicative of changes in composition of the effluent from the chromatographic column.

Detector 35 can be any suitable element which provides an output signal, preferably electrical, which is representative of vibrations impinging thereon. As illustrated in FIGURE 1, such an electrical signal can be applied to a counter circuit 40 which measures the frequency of the vibrations. This measurement thus provides an indication of changes in composition of the effluent gas from column 10. As an alternative, or in addition to counter 40, the output signal from detector 17 can be applied to a digital-to-analog converter 41 which establishes an output voltage, the magnitude of which is proportional to the frequency of the input signal. This voltage can be applied to a recorder 42 or other metering device to provide an indication of the frequency of the detector output.

In one specific embodiment of the detector of FIGURES 2 and 3, passage 24 was of rectangular cross-section and was 0.01 inch long, 0.001 inch wide, and 0.004 inch deep. Each leg 22 and 23 was also of rectangular cross-section and was 0.06 inch long, 0.04 inch wide and 0.004 inch deep, the depth being the same as for passage 24. Wedge 28 projected 0.02 inch into the passage, and the point made an angle of 8°. With helium being employed as the carrier gas and flowing through the detector at a rate of approximately 350 cc./min., vibrations having a frequency of approximately 250,000 cycles-second were detected by microphone 35. It can thus be seen that detectors which are quite small can be employed to advantage in accordance with this invention. However, the invention is by no means limited to these specific dimensions.

In the analyzer illustrated in FIGURE 1, it is important that the carrier gas be directed through column 10 at a uniform rate. Otherwise, changes in flow of the carrier gas may influence the frequency of vibrations measured by the detector. Flow regulator 12 is employed for this purpose.

A second embodiment of a chromatographic analyzer employing two detectors of this invention is illustrated in FIGURE 4. This analyzer is similar to the analyzer of FIGURE 1 in many respects and corresponding elements are designated by corresponding reference numerals. The analyzer of FIGURE 4 is provided with an additional detector 17'. A portion of the carrier gas is directed by a conduit 50 through a second flow regulator 12' to the inlet of detector 17'. Detector 17' thus provides an output signal of constant frequency because carrier gas alone flows through this detector at all times. The output signal from detector 17 varies in frequency as individual constituents of the sample appear in the column effluent. The output electrical signals from detectors 17 and 17' are applied to the respective inputs of a mixer 51. The output signal from mixer 51, which can be measured by cricuits similar to those shown in FIGURE 1, is thus representative of the difference between the frequencies of the output signals from detectors 17 and 17'. This signal normally is zero prior to sample constituents appearing in the column effluent, and will increase in accordance with the amount the frequency of the signal from detector 17 is changed due to the sample constituents.

While the detector of this invention is particularly useful in chromatographic analysis, it should be evident that it can be employed alone as a monitoring or analytical instrument to detect changes in composition of gaseous streams. While the invention has been described in conjunction with presently preferred embodiments, it should be evident that it is not limited thereto.

What is claimed is:
1. An improved whistle type acoustic frequency detector for gas comprising in combination:
   a body having a first straight passage therein, the ends of said first passage being open ended resonating cavities in communication with the exterior of said body;
   said body having a second passage therein for the inlet under pressure of the gas ot be tested;
   said second passage being disposed in communication at right angles with the central portion of said first passage;
   said body having a wedge extending into said first passage with its apex disposed to split gas entering said first passage from said second passage between the two ends of said first passage, thereby forming a whistle with two open ended resonating cavities, one in each end of said first passage; and
   a vibration detector adjacent one of said resonating cavities.
2. In the combination of claim 1:
   said body having an enlarged cavity connected to each end of said first passage, and an outlet passage to the exterior from each enlarged cavity.
3. In the combination of claim 2:
   said vibration detector being disposed in one of said outlet passages.

References Cited
UNITED STATES PATENTS

| | | | |
|---|---|---|---|
| 2,582,232 | 1/1952 | Cesaro et al. | 73—24 XR |
| 2,788,656 | 4/1957 | Sander | 73—24 |
| 3,144,762 | 8/1964 | Testerman et al. | 73—24 XR |
| 1,269,599 | 6/1918 | Haber et al. | 73—24 |
| 2,984,097 | 5/1961 | Kniazuk et al. | 73—24 |
| 3,229,501 | 1/1966 | Henze et al. | 73—23.1 |
| 3,273,377 | 9/1966 | Testerman et al. | 73—23.4 |

OTHER REFERENCES

Schumacher: Gas, February 1939, pp. 17, 18 and 58, copy in 73-24.

RICHARD C. QUEISSER, *Primary Examiner.*

C. A. RUEHL, *Assistant Examiner.*